(12) United States Patent
Cao et al.

(10) Patent No.: US 10,892,707 B2
(45) Date of Patent: Jan. 12, 2021

(54) PHOTOVOLTAIC MODULE MONITORING APPARATUS AND POWER SYSTEM

(71) Applicant: HUAWEI TECHNOLOGIES CO., LTD., Shenzhen (CN)

(72) Inventors: Fayin Cao, Shenzhen (CN); Wei Shui, Shenzhen (CN); Xun Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 15/916,296

(22) Filed: Mar. 9, 2018

(65) Prior Publication Data

US 2018/0198406 A1    Jul. 12, 2018

Related U.S. Application Data

(63) Continuation of application No. PCT/CN2017/073991, filed on Feb. 17, 2017.

(30) Foreign Application Priority Data

May 20, 2016  (CN) .......................... 2016 1 0338915

(51) Int. Cl.
    *H02S 50/10*    (2014.01)
    *H02S 40/32*    (2014.01)

(52) U.S. Cl.
    CPC ............. *H02S 50/10* (2014.12); *H02S 40/32* (2014.12)

(58) Field of Classification Search
    None
    See application file for complete search history.

(56) References Cited

U.S. PATENT DOCUMENTS

| | | | | |
|---|---|---|---|---|
| 6,150,795 A | * | 11/2000 | Kutkut | H02J 7/0018 320/118 |
| 2005/0172995 A1 | * | 8/2005 | Rohrig | H01L 31/02021 136/243 |

(Continued)

FOREIGN PATENT DOCUMENTS

| CN | 101969214 A | 2/2011 |
|---|---|---|
| CN | 102473764 A | 5/2012 |

(Continued)

OTHER PUBLICATIONS

Shuang Xu in Single-Phase Differential Buck—Boost Inverter With Pulse Energy Modulation and Power Decoupling Control, IEEE Journal of Emerging and Selected Topics in Power Electronics, vol. 6, No. 4, Dec. 2018, pp. 2060-2072 (Year: 2018).*

(Continued)

*Primary Examiner* — Tung S Lau
(74) *Attorney, Agent, or Firm* — Kilpatrick Townsend & Stockton, LLP

(57) ABSTRACT

A photovoltaic module monitoring apparatus includes a driver module, configured to: receive a status request differential signal sent by an inverter of the power system; obtain, according to the status request differential signal, status information of a photovoltaic PV module corresponding to the photovoltaic module monitoring apparatus; modulate the status information of the photovoltaic PV module to generate a status response differential signal; and send the status response differential signal to the inverter; and a bypass module parallelly connected to the driver module, configured to transmit the status request differential signal and the status response differential signal, where an impedance of the bypass module is less than an impedance of the photovoltaic PV module.

16 Claims, 11 Drawing Sheets

(56) References Cited

U.S. PATENT DOCUMENTS

| | | | |
|---|---|---|---|
| 2007/0139193 A1* | 6/2007 | Arik | F01D 17/02 |
| | | | 340/539.26 |
| 2012/0112531 A1* | 5/2012 | Kesler | H02J 50/12 |
| | | | 307/9.1 |
| 2012/0197569 A1 | 8/2012 | Kruse et al. | |
| 2012/0256494 A1* | 10/2012 | Kesler | H02J 50/70 |
| | | | 307/104 |
| 2014/0067298 A1 | 3/2014 | Shenoy | |
| 2014/0265638 A1 | 9/2014 | Orr et al. | |
| 2015/0214887 A1* | 7/2015 | Ben-Yaakov | H02M 1/083 |
| | | | 307/52 |
| 2016/0079916 A1 | 3/2016 | Adest et al. | |

FOREIGN PATENT DOCUMENTS

| | | | | |
|---|---|---|---|---|
| CN | 103000719 A | 3/2013 | | |
| CN | 103929217 A | 7/2014 | | |
| CN | 104953946 A | 9/2015 | | |
| CN | 105932964 * | 9/2016 | | H02S 50/10 |
| CN | 105932964 A | 9/2016 | | |
| DE | 102012102932 A1 | 10/2013 | | |
| EP | 2 621 045 A2 * | 7/2013 | | H02H 7/20 |
| EP | 3 334 036 B1 * | 7/2019 | | H02S 50/10 |

OTHER PUBLICATIONS

Yasuyuki Kobayashi in Contactless Estimation of a Solar Cell Voltage in a Module Using Modulated Light and a Phase Detector, Electrical Engineering in Japan, vol. 204, No. 2, 2018, pp. 45-52 (Year: 2018).*

* cited by examiner

PHOTOVOLTAIC MODULE MONITORING APPARATUS AND POWER SYSTEM

CROSS-REFERENCE TO RELATED APPLICATION

This application is a continuation of International Application No. PCT/CN2017/073991, filed on Feb. 17, 2017, which claims priority to Chinese Patent Application No. 201610338915.2, filed on May 20, 2016. The disclosures of the aforementioned applications are hereby incorporated by reference in their entireties.

TECHNICAL FIELD

Embodiments of the present disclosure relate to the communications field, and in particular, to a photovoltaic module monitoring apparatus and a power system.

BACKGROUND

A photovoltaic (PV) power system is a new power generating system that uses a photovoltaic effect of a solar cell semiconductor material to directly convert solar radiation energy into electric energy. This power generating manner does not generate oxynitride, a gas harmful to human bodies, or a radioactive waste, and therefore has a broad development prospect.

To ensure normal working of the photovoltaic power system, information about a voltage, a temperature, and the like of each PV module (for example, a solar panel) included in the photovoltaic power system needs to be monitored. An existing photovoltaic power system generally includes an inverter, multiple PV modules, and a PV module monitoring apparatus corresponding to each PV module. After obtaining the information about the voltage, the temperature, and the like of the PV module, the PV module monitoring apparatus needs to encode the information, and sends encoded information to the inverter. However, the photovoltaic power system includes multiple PV modules, and the encoded information needs to be sent to the inverter after passing through the multiple PV modules. Therefore, the encoded information is attenuated once after passing through each PV module. A larger quantity of PV modules included in the photovoltaic power system indicates greater attenuation in the encoded information sent to the inverter. This significantly reduces reliability of power line communication.

SUMMARY

Embodiments of the present disclosure provide a photovoltaic module monitoring apparatus and a power system, so as to avoid attenuation caused when data passes through a PV module, and improve reliability of power line communication.

To achieve the foregoing objective, the following technical solutions are used in the embodiments of the present disclosure.

According to a first aspect, an embodiment of the present disclosure provides a photovoltaic module monitoring apparatus, applied to a power system, where the photovoltaic module monitoring apparatus includes:

a driver module and a bypass module parallelly connected to the driver module, where the driver module is configured to: receive a status request differential signal sent by an inverter of the power system; obtain, according to the status request differential signal, status information of a photovoltaic PV module corresponding to the photovoltaic module monitoring apparatus; modulate the status information of the photovoltaic PV module to generate a status response differential signal; and send the status response differential signal to the inverter; the bypass module is configured to transmit the status request differential signal and the status response differential signal; and an impedance of the bypass module is less than an impedance of the photovoltaic PV module.

According to the photovoltaic module monitoring apparatus provided in this embodiment of the present disclosure, the bypass module configured to transmit the status request differential signal and the status response differential signal is disposed, and the impedance of the bypass module is less than the impedance of the PV module. Therefore, the status request differential signal and the status response differential signal are transmitted on a low impedance loop, so that attenuation caused when the status request differential signal and the status response differential signal in the prior art pass through the PV module is avoided, and reliability of power line communication is improved.

Further, the driver module specifically includes: a receiving module connected to the bypass module, a control module connected to the receiving module, and a sending module connected to all the control module, the receiving module, and the bypass module, where the receiving module is configured to: receive the status request differential signal sent by the inverter; demodulate the status request differential signal to generate a level signal used to request the status information of the photovoltaic PV module; and send the level signal to the control module; the control module is configured to receive the level signal sent by the receiving module; and read the status information of the photovoltaic PV module and then send the status information to the sending module according to the level signal; and the sending module is configured to: receive the status information of the photovoltaic PV module sent by the control module; modulate the status information of the photovoltaic PV module to generate the status response differential signal; and send the status response differential signal to the inverter.

Further, the bypass module specifically includes: a first capacitor connected to both the sending module and the receiving module, where one end of the first capacitor is connected to the sending module, and the other end of the first capacitor is connected to the receiving module.

According to the photovoltaic module monitoring apparatus provided in this embodiment of the present disclosure, the capacitor is a device that isolates a direct current and conducts an alternating current. Therefore, during alternating current transmission, the impedance of the bypass module is far less than the impedance of the PV module.

In some embodiments, the bypass module further includes: a resistor connected to the first capacitor, where one end of the resistor is connected to one end of the first capacitor, and the other end of the resistor is connected to the sending module.

In some embodiments, the bypass module further includes a switch element connected to the first capacitor, where one end of the switch element is connected to one end of the first capacitor, the other end of the switch element is connected to the sending module, and the switch element is connected to the control module; and the control module is further configured to control conduction and disconnection of the switch element.

In some embodiments, the bypass module further includes a resistor connected to the first capacitor, and a switch element connected to the resistor, where one end of the resistor is connected to one end of the first capacitor, the other end of the resistor is connected to one end of the switch element, the other end of the switch element is connected to the sending module, and the switch element is connected to the control module; and the control module is further configured to control conduction and disconnection of the switch element.

According to the photovoltaic module monitoring apparatus provided in this embodiment of the present disclosure, the photovoltaic module monitoring apparatus includes a switch element, and a control module can control conduction and disconnection of the switch element. Therefore, when a status request differential signal and a status response differential signal need to be transmitted, a bypass module is conducted, or when a status request differential signal and a status response differential signal do not need to be transmitted, a bypass module is disconnected.

Further, the photovoltaic module monitoring apparatus further includes a second capacitor and a third capacitor, where one end of the second capacitor is connected to the sending module, the other end of the second capacitor is connected to the bypass module, one end of the third capacitor is connected to the receiving module, and the other end of the third capacitor is connected to the bypass module.

Further, the photovoltaic module monitoring apparatus further includes a power supply connected to the control module, configured to supply power to the control module.

According to a second aspect, an embodiment of the present disclosure provides a power system, including an inverter, at least one photovoltaic PV module serially connected to the inverter, and at least one photovoltaic module monitoring apparatus that is serially connected to the inverter and that is according to any one implementation of the first aspect, where the PV module and the photovoltaic module monitoring apparatus are in a one-to-one correspondence, and the photovoltaic PV module is parallelly connected to the photovoltaic module monitoring apparatus corresponding to the photovoltaic PV module.

According to the power system provided in the embodiments of the present disclosure, a bypass module configured to transmit a status request differential signal and a status response differential signal is disposed in a photovoltaic module monitoring apparatus included in the power system, and an impedance of the bypass module is less than an impedance of a PV module. Therefore, the status request differential signal and the status response differential signal are transmitted on a low impedance loop, so that attenuation caused when the status request differential signal and the status response differential signal in the prior art pass through the PV module is avoided, and reliability of power line communication is improved.

DESCRIPTION OF EMBODIMENTS

The technologies described in the embodiments of the present disclosure are mainly applied to a direct current power system. The power system uses an electrical power cable as a transmission medium, and transmits an analog signal or a digital signal at a high speed by using a carrier, and is a communication manner specific to a power system. The greatest feature of the direct current power system is that an additional communications line does not need to be set up, and only an existing electrical power cable needs to be used to transmit data, so that line complexity and construction costs of the power system may be effectively reduced.

Figure 1:
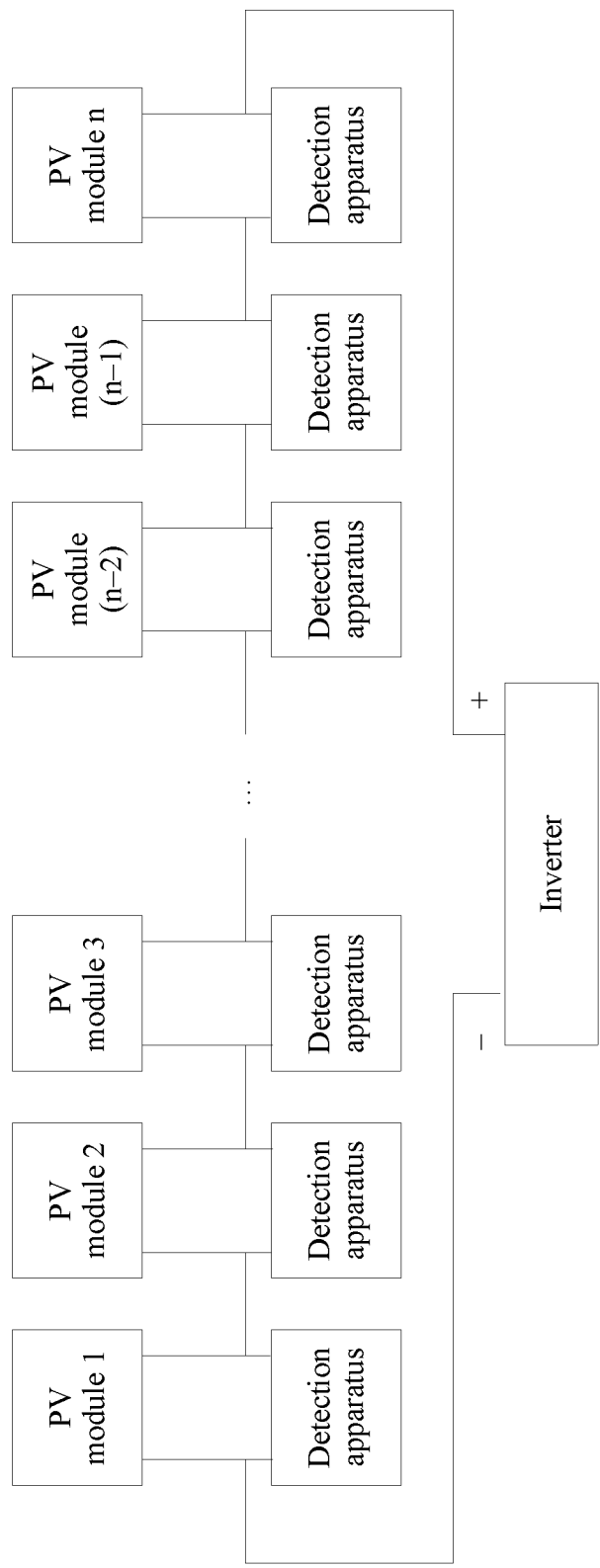
FIG. 1 is a schematic structural diagram of a power system in the prior art.

The power system generally includes multiple PV modules. To ensure normal working of the power system, information about a voltage, a temperature, and the like of each PV module included in the power system needs to be monitored. A schematic structural diagram of an existing power system is shown in FIG. 1. The power system includes an inverter, multiple PV modules, and a monitoring apparatus corresponding to each PV module. Each PV module is parallelly connected to the monitoring apparatus corresponding to the PV module. Specifically, an input end of each PV module is connected to an input end of the monitoring apparatus corresponding to the PV module, and an output end of each PV module is connected to an output end of the monitoring apparatus corresponding to the PV module.

In an example in which the power system monitors information about a PV module 1, the inverter first sends a status request message to a monitoring apparatus (referred to as the monitoring apparatus of the PV module 1 herein) corresponding to the PV module 1. After obtaining the information about the PV module 1 according to the status request message, the monitoring apparatus of the PV module 1 encodes the information about the PV module 1, and returns encoded information to the inverter. However, the multiple PV modules are serially connected. Therefore, the information about the PV module 1 can be returned to the inverter only after passing through a PV module 2, a PV module 3, ..., and a PV module n. The information about the PV module 1 is attenuated once after passing through each PV module. Therefore, when receiving the information about the PV module 1, the inverter may be incapable of identifying the information about the PV module 1, significantly reducing reliability of power line communication.

Embodiments in accordance with the present disclosure provide a photovoltaic module monitoring apparatus, so as to ensure that data is transmitted on a low impedance loop of the photovoltaic module monitoring apparatus, avoid attenuation caused when the data passes through a PV module, and improve reliability of power line communication.

It should be noted that, the term "and/or" in this specification describes only an association relationship for describing associated objects and represents that three relationships may exist. For example, A and/or B may represent the following three cases: A exists, both A and B exist, or B exists. In addition, the character "/" in this specification generally indicates an "or" relationship between the associated objects.

In the specification, claims, and accompanying drawings in the embodiments of the present disclosure, the terms "first", "second", "third", and so on are intended to distinguish between different objects but do not indicate a particular order. In addition, the terms "including", "having", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 2:
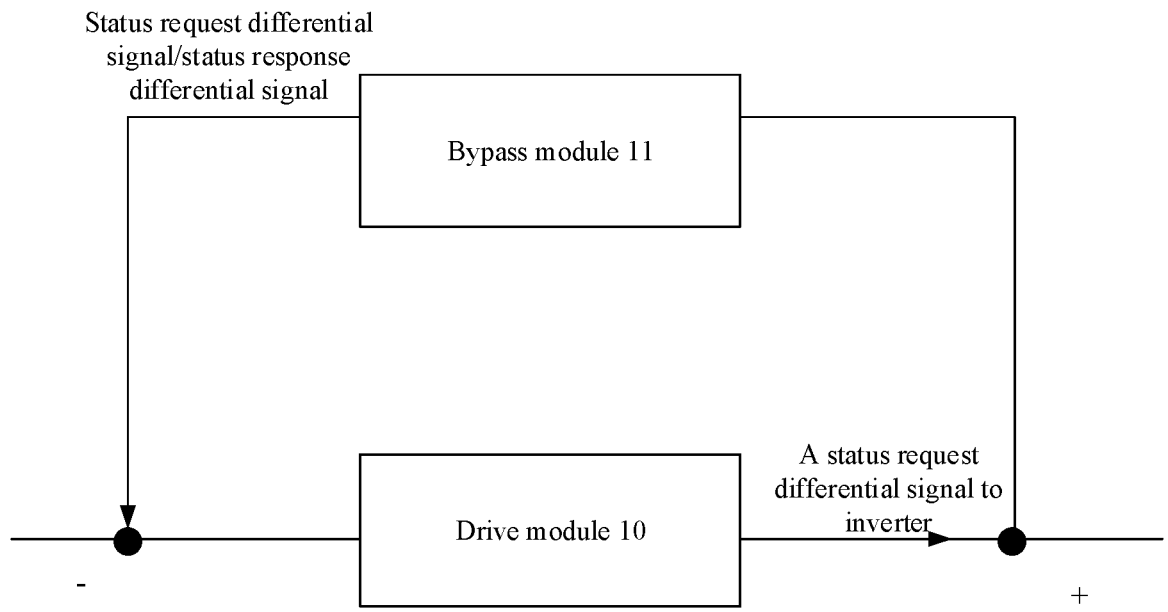
FIG. 2 is a schematic structural diagram 1 of a photovoltaic module monitoring apparatus according to an embodiment of the present disclosure.

An embodiment in accordance with the present disclosure provides a photovoltaic module monitoring apparatus, which is applied to a power system. As shown in FIG. 2, the apparatus includes a driver module 10 and a bypass module 11.

The driver module 10 is configured to: receive a status request differential signal sent by an inverter of the power system; obtain, according to the status request differential signal, status information of a photovoltaic PV module corresponding to the photovoltaic module monitoring apparatus; modulate the status information of the photovoltaic PV module to generate a status response differential signal; and send the status response differential signal to the inverter.

The bypass module 11 parallelly connected to the driver module 10 is configured to transmit the status request differential signal and the status response differential signal.

An impedance of the bypass module 11 is less than an impedance of the photovoltaic PV module.

Specifically, an input end of the driver module 10 is connected to an input end of the bypass module 11, and an output end of the driver module 10 is connected to an output end of the bypass module 11.

It should be noted that the photovoltaic module monitoring apparatus provided in this embodiment of the present disclosure is parallelly connected to a PV module corresponding to the photovoltaic module monitoring apparatus, and a positive end and a negative end (as shown in FIG. 2) of the PV module corresponding to the photovoltaic module monitoring apparatus are respectively connected to those of the driver module 10.

It may be understood that information received and transmitted by the photovoltaic module monitoring apparatus is a differential signal. Differential signal transmission and receiving are a signal transmission technology different from a conventional technology of a single end signal. In differential transmission, signals are transmitted on both cables, and the two signals have same amplitudes but opposite phases. The signals transmitted on the two cables are differential signals.

When the photovoltaic module monitoring apparatus detects the PV module corresponding to the photovoltaic module monitoring apparatus, a pair of status request differential signals sent by the inverter is respectively transmitted, after passing through the bypass module 11, from the positive end and the negative end shown in FIG. 2 to the driver module 10. The driver module 10 demodulates the pair of status request differential signals to generate a level signal used to request the status information of the photovoltaic PV module, reads the status information of the photovoltaic PV module according to the level signal, modulates the status information of the PV module to generate a pair of status response differential signals, and sends, by using the bypass module 11, the pair of status response differential signals from the positive end and the negative end shown in FIG. 2 to the inverter. The impedance of the bypass module 11 is less than the impedance of the PV module. Therefore, the status request differential signal and the status response differential signal are transmitted on a low impedance loop, so that attenuation caused when the status request differential signal and the status response differential signal in the prior art pass through the PV module is avoided, and reliability of power line communication is improved.

It should be noted that the photovoltaic module monitoring apparatus is parallelly connected to the PV module. Therefore, the driver module 10 of the photovoltaic module monitoring apparatus may directly read the status information of the PV module. The status information of the PV module may include but is not limited to status information such as a temperature of the PV module and a voltage of the PV module.

Figure 3:
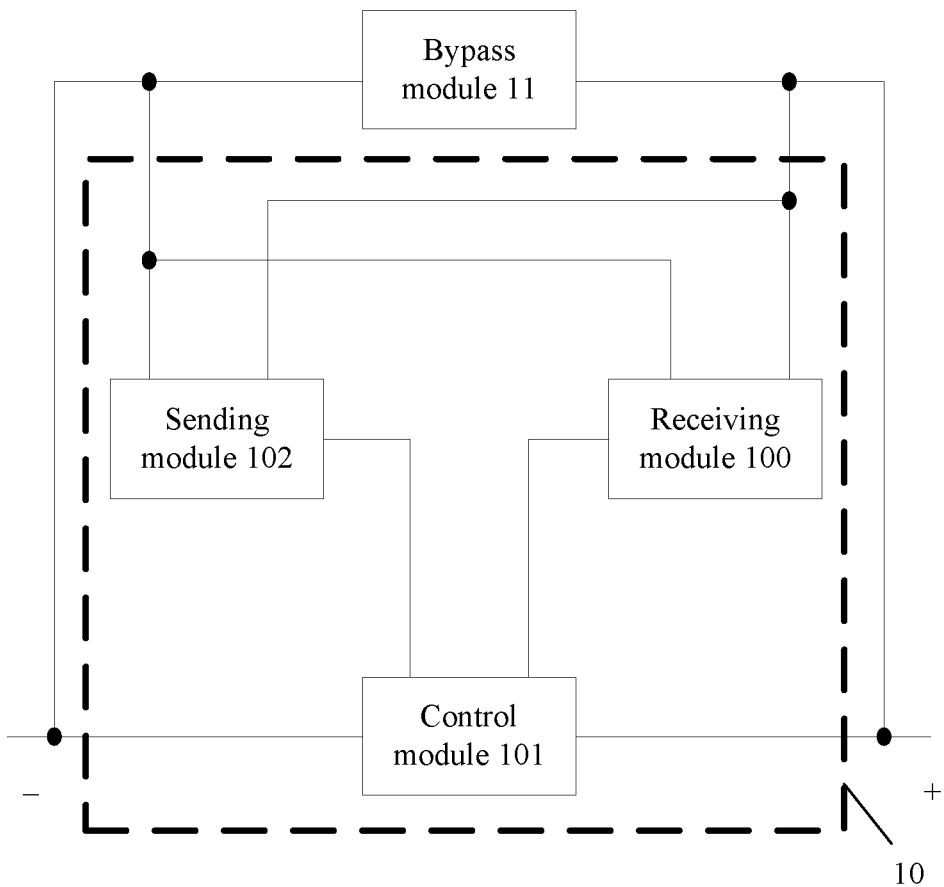
FIG. 3 is a schematic structural diagram 2 of a photovoltaic module monitoring apparatus according to an embodiment of the present disclosure.

In some embodiments, as shown in FIG. 3, the driver module 10 includes:

a receiving module 100 connected to the bypass module 11, configured to: receive the status request differential signal sent by the inverter; demodulate the status request differential signal to generate a level signal; and send the level signal to a control module 101, where the level signal for requesting the status information of the photovoltaic PV module;

the control module 101 connected to the receiving module 100, configured to receive the level signal sent by the receiving module 100; and read the status information of the photovoltaic PV module and then send the status information to a sending module 102 according to the level signal; and the sending module 102 connected to all the control module 101, the receiving module 100, and the bypass module 11, configured to: receive the status information of the photovoltaic PV module sent by the control module; modulate the status information of the photovoltaic PV module to generate the status response differential signal; and send the status response differential signal to the inverter.

Figure 4:
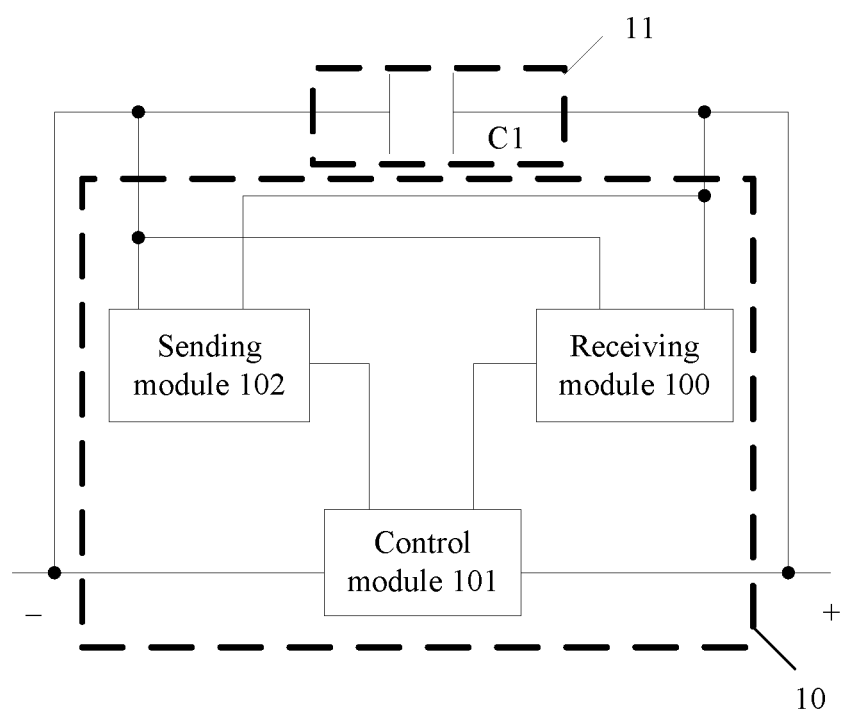
FIG. 4 is a schematic structural diagram 3 of a photovoltaic module monitoring apparatus according to an embodiment of the present disclosure.

Further, as shown in FIG. 4, the bypass module 11 in some embodiments includes:

a first capacitor C1 connected to both the sending module 102 and the receiving module 100, where one end of the first capacitor C1 is connected to the sending module 102, and the other end of the first capacitor C1 is connected to the receiving module 100.

It may be understood that the capacitor is a device that isolates a direct current and conducts an alternating current. Therefore, the impedance of the bypass module is far less than the impedance of the PV module, so that a status request differential signal and a status response differential signal are transmitted on a low impedance loop, avoiding attenuation caused when the status request differential signal and the status response differential signal in the prior art pass through the PV module, and improving reliability of power line communication.

Figure 5:
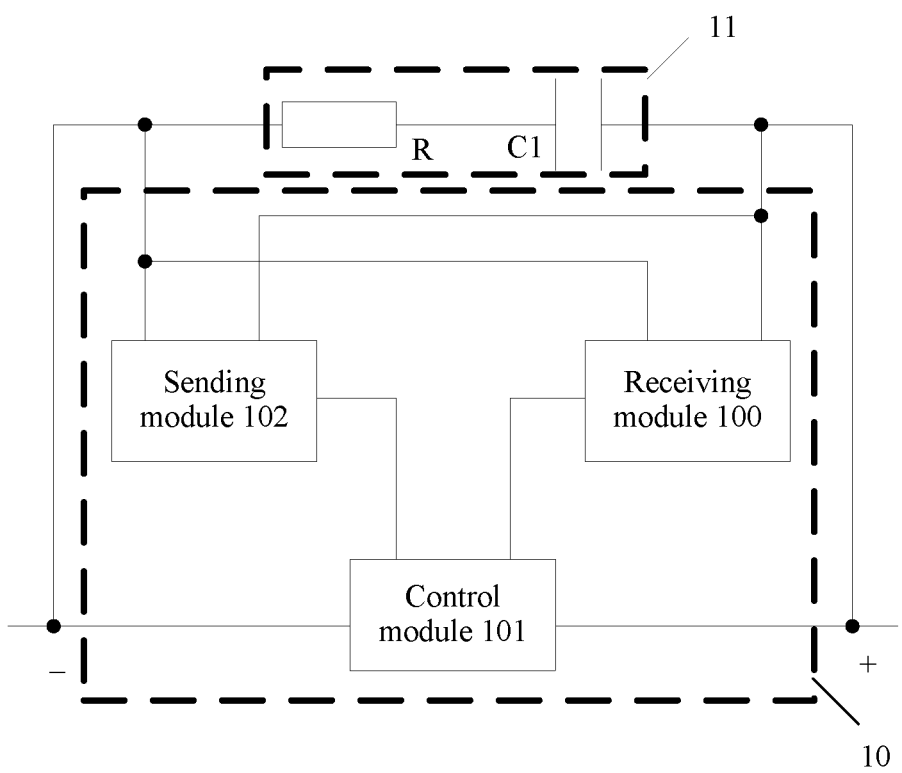
FIG. 5 is a schematic structural diagram 4 of a photovoltaic module monitoring apparatus according to an embodiment of the present disclosure.

In a first possible implementation, with reference to FIG. 4, as shown in FIG. 5, the bypass module 11 further includes a resistor R serially connected to the first capacitor C1. One end of the resistor R is connected to one end of the first capacitor C1, and the other end of the resistor R is connected to the sending module 102.

Figure 6:
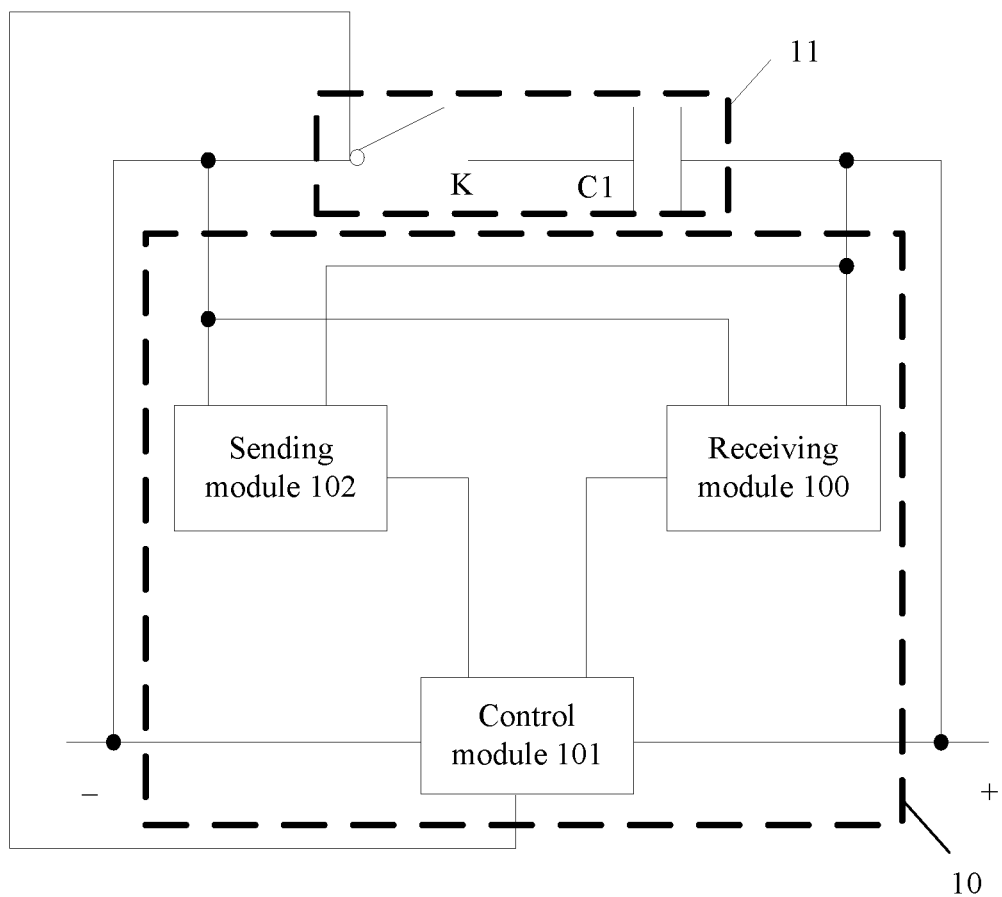
FIG. 6 is a schematic structural diagram 5 of a photovoltaic module monitoring apparatus according to an embodiment of the present disclosure.

In a second possible implementation, with reference to FIG. 4, as shown in FIG. 6, the bypass module 11 further includes a switch element K serially connected to the first capacitor C1. One end of the switch element K is connected to one end of the first capacitor C1, the other end of the switch element K is connected to the sending module 102.

Further, the switch element K is connected to the control module 101. The control module 101 is further configured to control conduction and disconnection of the switch element.

It may be understood that when the bypass module 11 needs to transmit the status request differential signal and the status response differential signal, the control module 101 controls the switch K to be conducted. Alternatively, when the bypass module 11 does not need to transmit the status request differential signal and the status response differential signal, the control module 101 controls the switch K to be disconnected.

Figure 7:
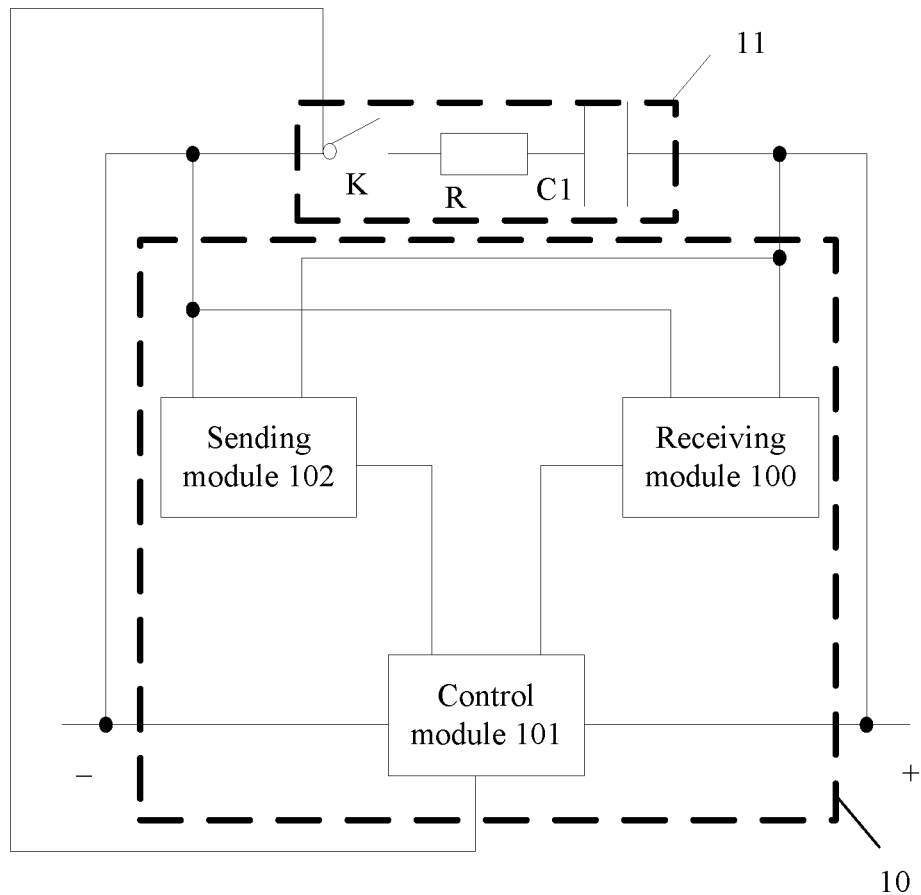
FIG. 7 is a schematic structural diagram 6 of a photovoltaic module monitoring apparatus according to an embodiment of the present disclosure.

In a third possible implementation, with reference to FIG. 4, as shown in FIG. 7, the bypass module 11 further includes a resistor R serially connected to the first capacitor C1 and a switch element K serially connected to the resistor R. One end of the resistor R is connected to one end of the first capacitor C1, the other end of the resistor R is connected to one end of the switch element K, and the other end of the switch element K is connected to the sending module 102.

Further, the switch element K is connected to the control module 101. The control module 101 is further configured to control conduction and disconnection of the switch element K.

It may be understood that when the bypass module 11 needs to transmit the status request differential signal and the status response differential signal, the control module 101 controls the switch K to be conducted. Alternatively, when the bypass module 11 does not need to transmit the status request differential signal and the status response differential signal, the control module 101 controls the switch K to be disconnected.

Figure 8:
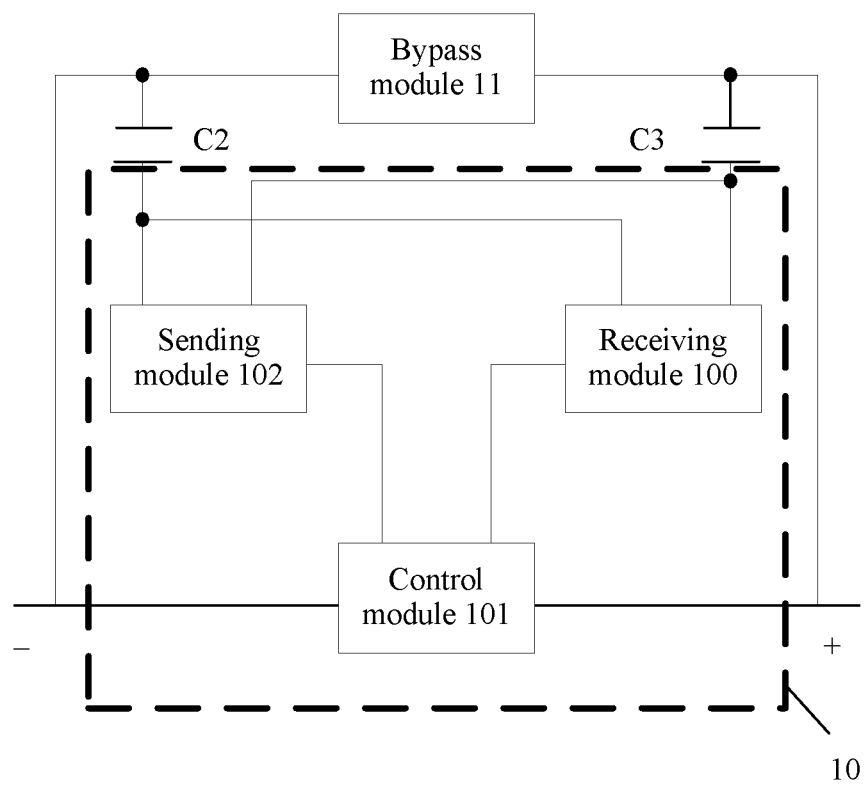
FIG. 8 is a schematic structural diagram 7 of a photovoltaic module monitoring apparatus according to an embodiment of the present disclosure.

In some embodiments, with reference to FIG. 3, as shown in FIG. 8, the photovoltaic module monitoring apparatus further includes:

a second capacitor C2 and a third capacitor C3, where one end of the second capacitor C2 is connected to the sending module 102, the other end of the second capacitor C2 is connected to the bypass module 11, one end of the third capacitor C3 is connected to the receiving module 100, and the other end of the third capacitor C3 is connected to the bypass module 11.

The second capacitor C2 is configured to perform rectification and filtering on a status request differential signal and a status response differential signal that pass through the second capacitor C2. The third capacitor C3 is configured to perform rectification and filtering on a status request differential signal and a status response differential signal that pass through the third capacitor C3.

Figure 9:
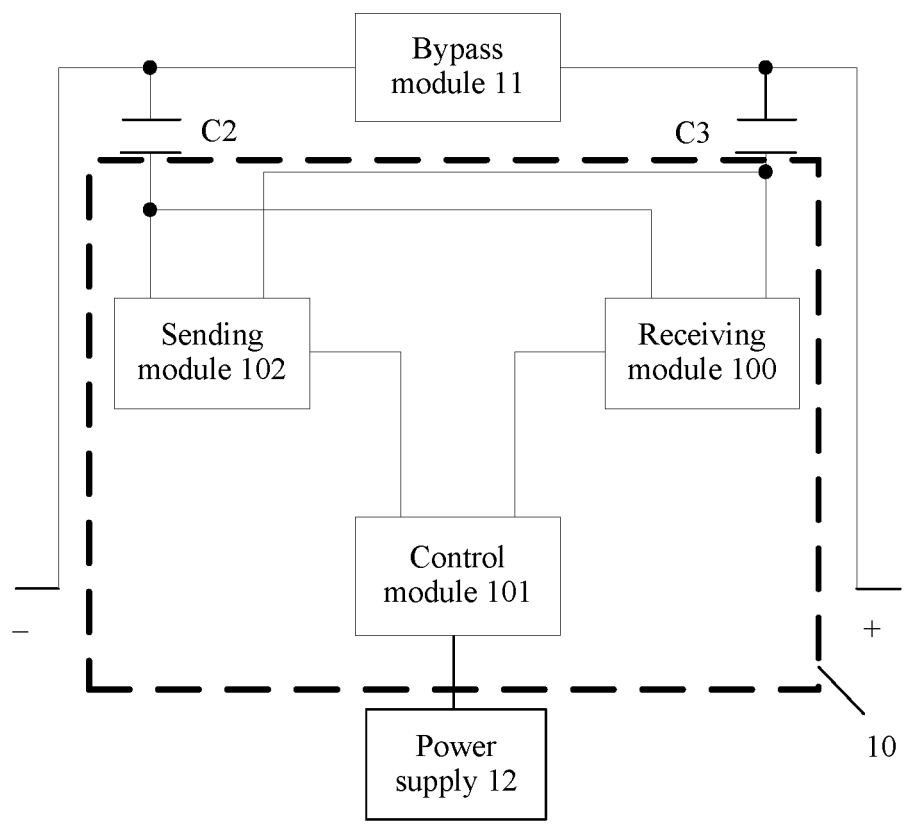
FIG. 9 is a schematic structural diagram 8 of a photovoltaic module monitoring apparatus according to an embodiment of the present disclosure.

In some embodiments, with reference to FIG. 8, as shown in FIG. 9, the photovoltaic module monitoring apparatus further includes:

a power supply 12 connected to the control module 101, configured to supply power to the control module 101.

It should be noted that if the photovoltaic module monitoring apparatus does not include the power supply 12, the inverter in the power system supplies power to the control module 101. Alternatively, if the photovoltaic module monitoring apparatus includes the power supply 12, the power supply 12 built in the photovoltaic module monitoring apparatus is configured to supply power to the control module 101. This is not limited in this embodiment of the present disclosure.

This embodiment in accordance with the present disclosure provides a photovoltaic module monitoring apparatus, applied to a power system, where the photovoltaic module monitoring apparatus includes: a driver module, configured to: receive a status request differential signal sent by an inverter of the power system; obtain, according to the status request differential signal, status information of a photovoltaic PV module corresponding to the photovoltaic module monitoring apparatus; modulate the status information of the photovoltaic PV module to generate a status response differential signal; and send the status response differential signal to the inverter; and a bypass module parallelly connected to the driver module, configured to transmit the status request differential signal and the status response differential signal, where an impedance of the bypass module is less than an impedance of the photovoltaic PV module. Based on the description in the foregoing embodiment, the bypass module configured to transmit the status request differential signal and the status response differential signal is disposed, and the impedance of the bypass module is less than the impedance of the PV module. Therefore, the status request differential signal and the status response differential signal are transmitted on a low impedance loop, so that attenuation caused when the status request differential signal and the status response differential signal in the prior art pass through the PV module is avoided, and reliability of power line communication is improved.

Figure 10:
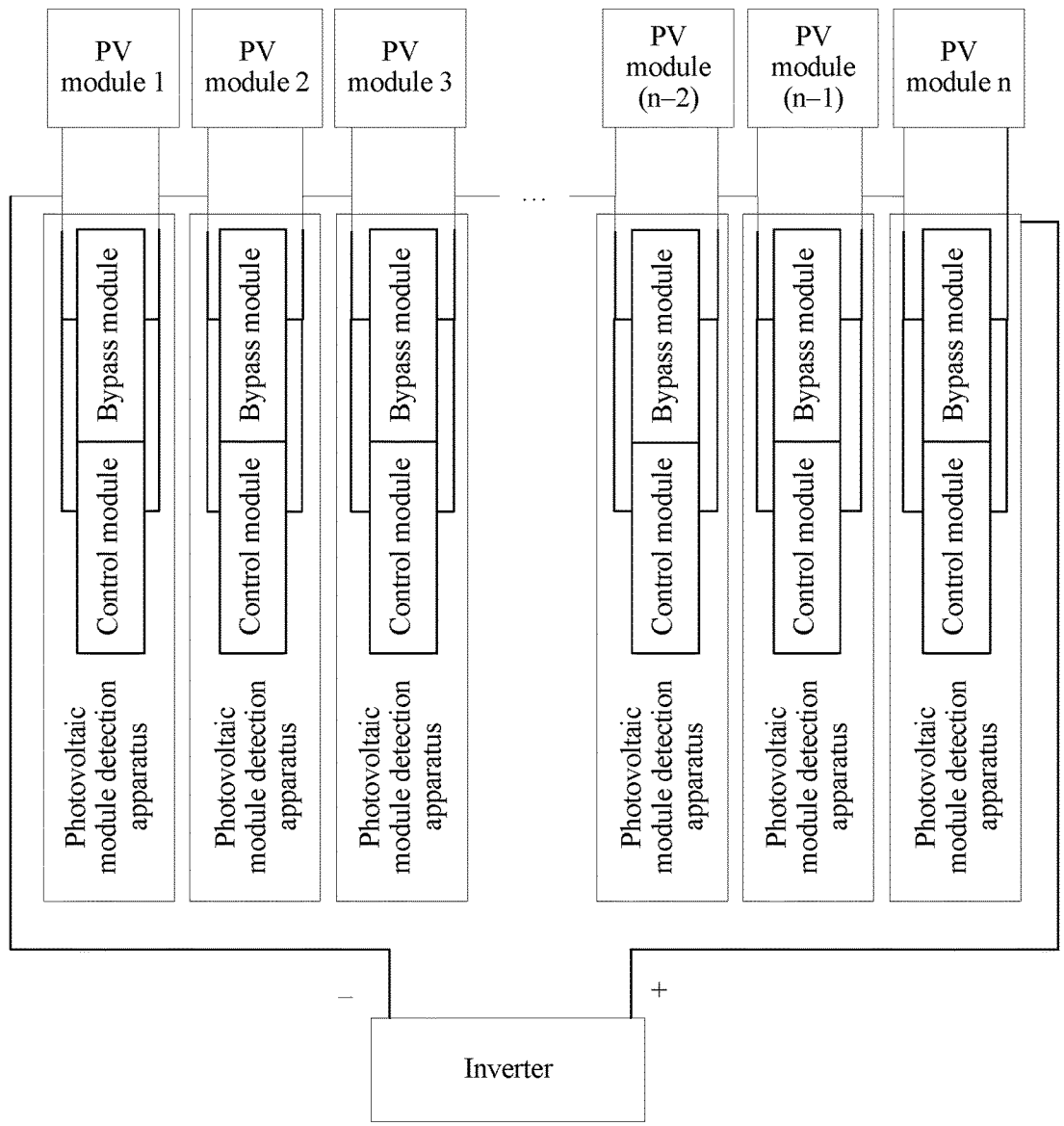
FIG. 10 is a schematic structural diagram of a power system according to an embodiment of the present disclosure.

An embodiment in accordance with the present disclosure provides a power system, as shown in FIG. 10, including an inverter and at least one photovoltaic PV module serially connected to the inverter, where the power system further includes:

at least one photovoltaic module monitoring apparatus that is serially connected to the inverter and that has any of the foregoing features, where the photovoltaic PV module is in a mapping relationship with the photovoltaic module monitoring apparatus, and the photovoltaic PV module is parallelly connected to the photovoltaic module monitoring apparatus with which the photovoltaic PV module is in the mapping relationship.

It may be understood that a mapping relationship between the photovoltaic PV module and the photovoltaic module monitoring apparatus means that the photovoltaic PV module and the photovoltaic module monitoring apparatus are in a one-to-one correspondence, and in the power system, a quantity of photovoltaic PV modules is equal to a quantity of photovoltaic module monitoring apparatuses. As shown in FIG. 10, the quantity of photovoltaic PV modules is n. Therefore, the quantity of photovoltaic module monitoring apparatuses is n. In addition, a photovoltaic PV module is parallelly connected to a photovoltaic module monitoring apparatus with which the photovoltaic PV module is in a mapping relationship.

In an example in which the power system monitors information about a PV module 1, the inverter first sends a pair of status request differential signals from a positive end and a negative end of the inverter to a photovoltaic module monitoring apparatus corresponding to the PV module 1. After obtaining the information about the PV module 1 according to the status request differential signals, the photovoltaic module monitoring apparatus corresponding to the PV module 1 encodes the information about the PV module 1 to generate a pair of status response differential signals, and returns the status response differential signals to the inverter. Multiple PV modules are serially connected, and multiple photovoltaic module monitoring apparatuses are also serially connected. Therefore, a negative status response differential signal is returned to the inverter after passing through a bypass module 11 of the photovoltaic module monitoring apparatus corresponding to the PV module 1, and a positive status response differential signal is returned to the inverter by successively passing through the bypass module 11 of the photovoltaic module monitoring apparatus corresponding to the PV module 1, a bypass module 11 of a photovoltaic module monitoring apparatus corresponding to a PV module 2, a bypass module 11 of a photovoltaic module monitoring apparatus corresponding to a PV module 3, . . . , and a bypass module 11 of a photovoltaic module monitoring apparatus corresponding to a PV module n, so that a status response differential signal is transmitted on a low impedance loop. Likewise, a principle for transmitting a status request differential signal is the same as that for transmitting a status response differential signal. Details are not described herein.

In an example in which the power system monitors information about a PV module 2, the inverter first sends a pair of status request differential signals from a positive end and a negative end of the inverter to a photovoltaic module monitoring apparatus corresponding to the PV module 2. After obtaining the information about the PV module 2 according to the status request differential signals, the photovoltaic module monitoring apparatus corresponding to the PV module 2 encodes the information about the PV module 2 to generate a pair of status response differential signals, and returns the status response differential signals to the inverter. Multiple PV modules are serially connected, and multiple photovoltaic module monitoring apparatuses are also serially connected. Therefore, a negative status response differential signal is returned to the inverter after passing through a bypass module 11 of the photovoltaic module monitoring apparatus corresponding to the PV module 2 and a bypass module 11 of a photovoltaic module monitoring apparatus corresponding to a PV module 1, and a positive status response differential signal is returned to the inverter by successively passing through the bypass module 11 of the photovoltaic module monitoring apparatus corresponding to the PV module 2, a bypass module 11 of a photovoltaic module monitoring apparatus corresponding to a PV module 3, . . . , and a bypass module 11 of a photovoltaic module monitoring apparatus corresponding to a PV module n, so that a status response differential signal is transmitted on a low impedance loop. Likewise, a principle for transmitting a status request differential signal is the same as that for transmitting a status response differential signal. Details are not described herein.

This embodiment in accordance with the present disclosure provides a power system, including an inverter, at least one photovoltaic PV module serially connected to the inverter, and at least one photovoltaic module monitoring apparatus that is serially connected to the inverter and that has any of the foregoing features, where the photovoltaic PV module and the photovoltaic module monitoring apparatus are in a one-to-one correspondence, and the photovoltaic PV module is parallelly connected to the photovoltaic module monitoring apparatus corresponding to the photovoltaic PV module. Based on the description in the foregoing embodiment, a bypass module configured to transmit a status request differential signal and a status response differential signal is disposed in a photovoltaic module monitoring apparatus included in the power system, and an impedance of the bypass module is less than an impedance of a PV module. Therefore, the status request differential signal and the status response differential signal are transmitted on a low impedance loop, so that attenuation caused when the status request differential signal and the status response differential signal in the prior art pass through the PV module is avoided, and reliability of power line communication is improved.

Figure 11:
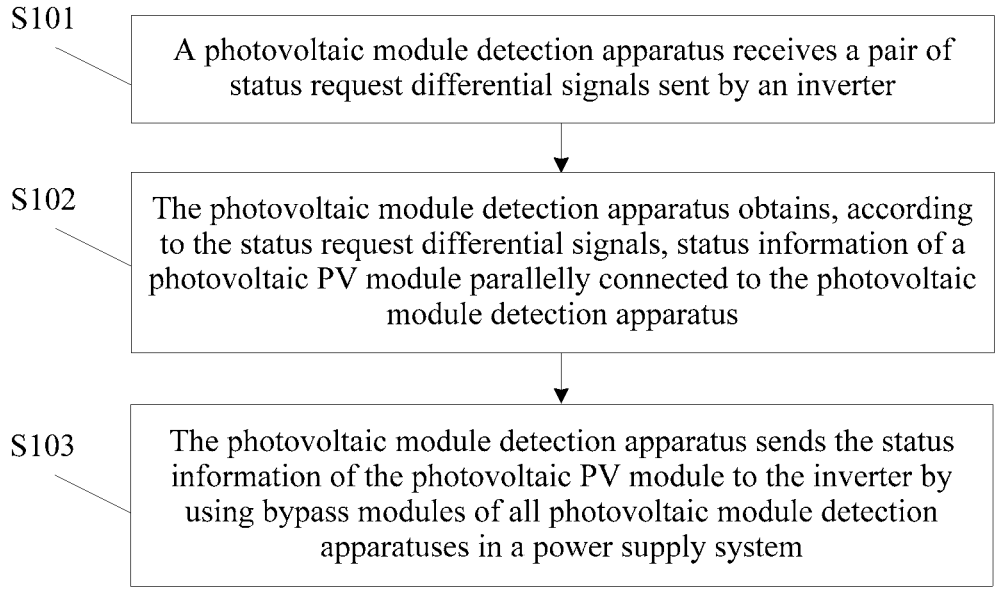
FIG. 11 is a schematic flowchart 1 of a power line communication method according to an embodiment of the present disclosure.

An embodiment in accordance with the present disclosure further provides a power line communication method, which is applied to the power system described in the foregoing embodiment. As shown in FIG. 11, the method includes:

S101. A photovoltaic module monitoring apparatus receives a pair of status request differential signals sent by an inverter.

It should be noted that the power system generally detects only one PV module in the power system at a same time.

Specifically, a receiving module in the photovoltaic module monitoring apparatus receives, by using a bypass module, the pair of status request differential signals sent by the inverter.

S102. The photovoltaic module monitoring apparatus obtains, according to the status request differential signals, status information of a photovoltaic PV module parallelly connected to the photovoltaic module monitoring apparatus.

Figure 12:
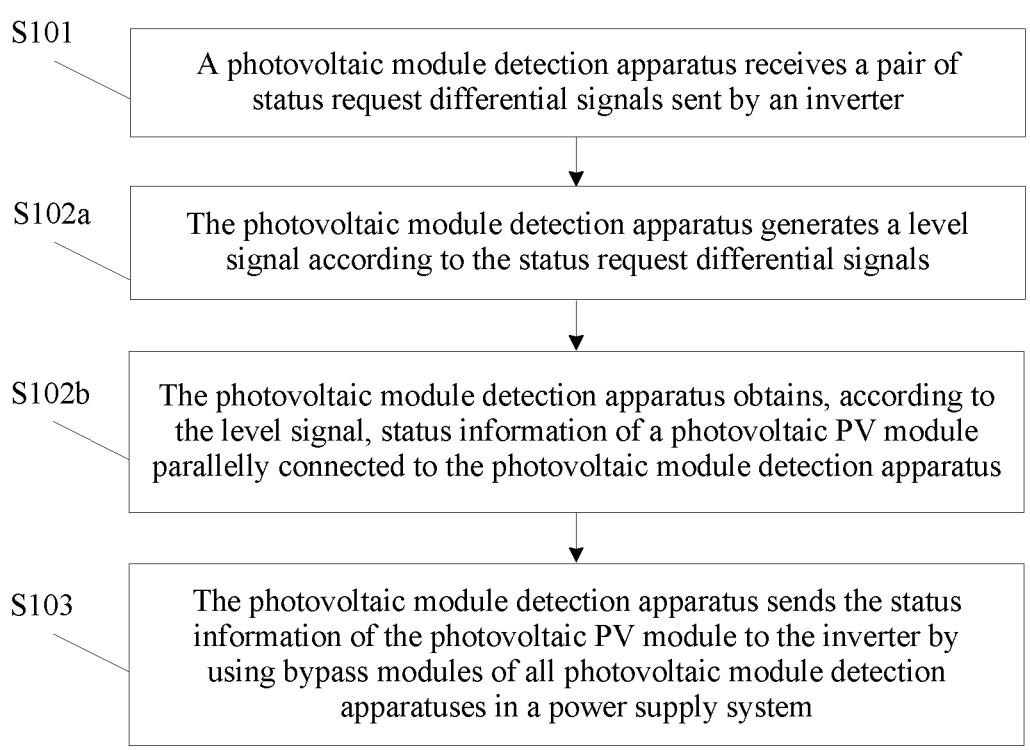
FIG. 12 is a schematic flowchart 2 of a power line communication method according to an embodiment of the present disclosure.

Specifically, as shown in FIG. 12, step S102 may include S102a and S102b.

S102a. The photovoltaic module monitoring apparatus generates a level signal according to the status request differential signals.

Specifically, the receiving module of the photovoltaic module monitoring apparatus demodulates the pair of status request differential signals to generate the level signal, and sends the level signal to a control module, where the level signal for requesting the status information of the photovoltaic PV module.

S102b. The photovoltaic module monitoring apparatus obtains, according to the level signal, status information of the photovoltaic PV module parallelly connected to the photovoltaic module monitoring apparatus.

Specifically, after receiving the level signal, the control module of the photovoltaic module monitoring apparatus obtains the status information of the photovoltaic PV module according to the level signal.

S103. The photovoltaic module monitoring apparatus sends the status information of the photovoltaic PV module to the inverter by using bypass modules of all photovoltaic module monitoring apparatuses in a power system.

Figure 13:
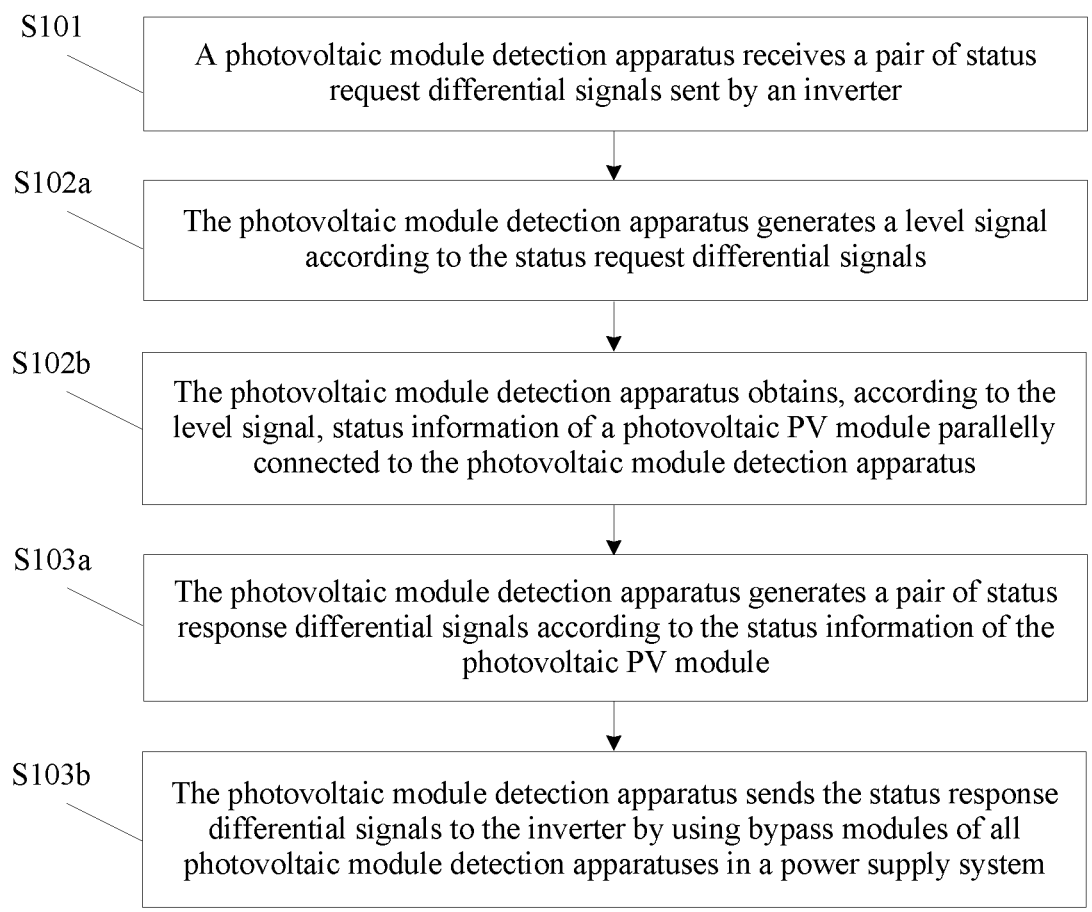
FIG. 13 is a schematic flowchart 3 of a power line communication method according to an embodiment of the present disclosure.

Specifically, as shown in FIG. 13, step S103 may include S103a and S103b.

S103a. The photovoltaic module monitoring apparatus generates a pair of status response differential signals according to the status information of the photovoltaic PV module.

Specifically, the control module of the photovoltaic module monitoring apparatus sends the status information of the photovoltaic PV module to a sending module. After receiving the status information of the photovoltaic PV module sent by the control module, the sending module modulates the status information of the photovoltaic PV module to generate the pair of status response differential signals.

S103b. The photovoltaic module monitoring apparatus sends the status response differential signals to the inverter by using the bypass modules of all the photovoltaic module monitoring apparatuses in the power system.

Specifically, the sending module of the photovoltaic module monitoring apparatus sends the pair of status response differential signals to the inverter by using the bypass modules.

This embodiment in accordance with the present disclosure provides a power line communication method, which is applied to a power system that has any of the foregoing features. The method includes: receiving, by a photovoltaic module monitoring apparatus, a pair of status request differential signals sent by an inverter; obtaining, by the photovoltaic module monitoring apparatus according to the status request differential signals, status information of a photovoltaic PV module parallelly connected to the photovoltaic module monitoring apparatus; and sending, by the photovoltaic module monitoring apparatus, the status information of the photovoltaic PV module to the inverter by using bypass modules of all photovoltaic module monitoring apparatuses in the power system. Based on the description in the foregoing embodiment, a bypass module configured to transmit a status request differential signal and a status response differential signal is disposed, and an impedance of the bypass module is far less than an impedance of the PV module. Therefore, the status request differential signal and the status response differential signal are transmitted on a low impedance loop, so that attenuation caused when the status request differential signal and the status response differential signal in the prior art pass through the PV module is avoided, and reliability of power line communication is improved.

The foregoing descriptions are merely specific implementations of the present disclosure, but are not intended to limit the scope of the present disclosure. Any variation or replacement readily figured out by persons skilled in the art within the scope disclosed in the present disclosure shall fall within the scope of the present disclosure.

What is claimed is:

1. A photovoltaic module monitoring apparatus, applied to a power system, wherein the photovoltaic module monitoring apparatus comprises:
   a driver module, configured to:
     receive a status request differential signal sent by an inverter of the power system;
     obtain, according to the status request differential signal, status information of a photovoltaic PV module corresponding to the photovoltaic module monitoring apparatus;
     modulate the status information of the photovoltaic PV module to generate a status response differential signal; and
     send the status response differential signal to the inverter; and
   a bypass module parallelly connected to the driver module, configured to transmit the status request differential signal and the status response differential signal, wherein
   an impedance of the bypass module is less than an impedance of the photovoltaic PV module.

2. The photovoltaic module monitoring apparatus according to claim 1, wherein the driver module specifically comprises:
   a receiving module connected to the bypass module, the receiving module configured to:
     receive the status request differential signal sent by the inverter; and
     demodulate the status request differential signal to generate a level signal;
   a control module connected to the receiving module, the control module configured to receive the level signal sent by the receiving module; and
     read the status information of the photovoltaic PV module; and
   a sending module connected to all the control module, the receiving module, and the bypass module, the sending module configured to:
     receive the status information of the photovoltaic PV module sent by the control module;
     modulate the status information of the photovoltaic PV module to generate the status response differential signal; and
     send the status response differential signal to the inverter; and, wherein
   the receiving module is further configured to send the level signal to the control module, the level signal being for requesting the status information of the photovoltaic PV module; and
   the control module is further configured to send the status information to the sending module according to the level signal.

3. The photovoltaic module monitoring apparatus according to claim 1, wherein the bypass module specifically comprises:
   a first capacitor connected to both the sending module and the receiving module, wherein one end of the first capacitor is connected to the sending module, and the other end of the first capacitor is connected to the receiving module.

4. The photovoltaic module monitoring apparatus according to claim 1, wherein the photovoltaic module monitoring apparatus further comprises:
   a second capacitor and a third capacitor, wherein one end of the second capacitor is connected to the sending module, the other end of the second capacitor is connected to the bypass module, one end of the third capacitor is connected to the receiving module, and the other end of the third capacitor is connected to the bypass module.

5. The photovoltaic module monitoring apparatus according to claim 1, wherein the photovoltaic module monitoring apparatus further comprises:
   a power supply connected to the control module, the power supply configured to supply power to the control module.

6. The power system according to claim 1, wherein the photovoltaic module monitoring apparatus further comprises:
a power supply connected to the control module, configured to supply power to the control module.

7. The photovoltaic module monitoring apparatus according to claim 3, wherein the bypass module further comprises:
a resistor connected to the first capacitor, wherein
one end of the resistor is connected to one end of the first capacitor, and the other end of the resistor is connected to the sending module.

8. The photovoltaic module monitoring apparatus according to claim 3, wherein
the bypass module further comprises a switch element connected to the first capacitor, wherein
one end of the switch element is connected to one end of the first capacitor, the other end of the switch element is connected to the sending module, and the switch element is connected to the control module; and
the control module is further configured to control conduction and disconnection of the switch element.

9. The photovoltaic module monitoring apparatus according to claim 3, wherein
the bypass module further comprises a resistor connected to the first capacitor, and a switch element connected to the resistor, wherein one end of the resistor is connected to one end of the first capacitor, the other end of the resistor is connected to one end of the switch element, the other end of the switch element is connected to the sending module, and the switch element is connected to the control module; and
the control module is further configured to control conduction and disconnection of the switch element.

10. A power system, comprising an inverter and at least one photovoltaic PV module serially connected to the inverter, wherein the power system further comprises at least one photovoltaic module monitoring apparatus that is serially connected to the inverter, the photovoltaic module monitoring apparatus comprising:
a driver module, configured to:
receive a status request differential signal sent by an inverter of the power system;
obtain, according to the status request differential signal, status information of a photovoltaic PV module corresponding to the photovoltaic module monitoring apparatus;
modulate the status information of the photovoltaic PV module to generate a status response differential signal; and
send the status response differential signal to the inverter; and
a bypass module parallelly connected to the driver module, the bypass module configured to transmit the status request differential signal and the status response differential signal, an impedance of the bypass module is less than an impedance of the photovoltaic PV module; and, wherein
the photovoltaic PV module and the photovoltaic module monitoring apparatus are in a one-to-one correspondence, and the photovoltaic PV module is parallelly connected to the photovoltaic module monitoring apparatus corresponding to the photovoltaic PV module.

11. The power system according to claim 10, wherein the driver module specifically comprises:
a receiving module connected to the bypass module, the receiving module configured to:
receive the status request differential signal sent by the inverter; and demodulate the status request differential signal to generate a level signal;
a control module connected to the receiving module, the control module configured to receive the level signal sent by the receiving module; and
read the status information of the photovoltaic PV module; and
the sending module connected to all the control module, the receiving module, and the bypass module, the sending module configured to:
receive the status information of the photovoltaic PV module sent by the control module;
modulate the status information of the photovoltaic PV module to generate the status response differential signal; and
send the status response differential signal to the inverter; and, wherein
the receiving module is further configured to send the level signal to a control module, wherein the level signal is for requesting the status information of the photovoltaic PV module; and
the control module is further configured to send the status information to a sending module according to the level signal.

12. The power system according to claim 10, wherein the photovoltaic module monitoring apparatus further comprises:
a second capacitor and a third capacitor, wherein one end of the second capacitor is connected to the sending module, the other end of the second capacitor is connected to the bypass module, one end of the third capacitor is connected to the receiving module, and the other end of the third capacitor is connected to the bypass module.

13. The power system according to claim 11, wherein the bypass module specifically comprises:
a first capacitor connected to both the sending module and the receiving module, wherein one end of the first capacitor is connected to the sending module, and the other end of the first capacitor is connected to the receiving module.

14. The power system according to claim 13, wherein the bypass module further comprises:
a resistor connected to the first capacitor, wherein
one end of the resistor is connected to one end of the first capacitor, and the other end of the resistor is connected to the sending module.

15. The power system according to claim 14, wherein
the bypass module further comprises a switch element connected to the first capacitor, wherein
one end of the switch element is connected to one end of the first capacitor, the other end of the switch element is connected to the sending module, and the switch element is connected to the control module; and
the control module is further configured to control conduction and disconnection of the switch element.

16. The power system according to claim 15, wherein
the bypass module further comprises a resistor connected to the first capacitor, and a switch element connected to the resistor, wherein one end of the resistor is connected to one end of the first capacitor, the other end of the resistor is connected to one end of the switch element, the other end of the switch element is connected to the sending module, and the switch element is connected to the control module; and the control module is further configured to control conduction and disconnection of the switch element.

* * * * *